(12) United States Patent
Ito et al.

(10) Patent No.: US 8,617,751 B2
(45) Date of Patent: Dec. 31, 2013

(54) WATER CONTROL SHEET, GAS DIFFUSION SHEET, MEMBRANE-ELECTRODE ASSEMBLY AND POLYMER ELECTROLYTE FUEL CELL

(75) Inventors: Tatsunori Ito, Satte (JP); Manami Suzuki, Koga (JP); Tatsuo Nakamura, Itakura-machi (JP)

(73) Assignee: Japan Vilene Company, Ltd., Tokyo (JP)

(*) Notice: Subject to any disclaimer, the term of this patent is extended or adjusted under 35 U.S.C. 154(b) by 0 days.

(21) Appl. No.: 13/367,543

(22) Filed: Feb. 7, 2012

(65) Prior Publication Data

US 2013/0040213 A1 Feb. 14, 2013

(30) Foreign Application Priority Data

Feb. 7, 2011 (JP) .................. P2011-023833
Mar. 4, 2011 (JP) .................. P2011-047767

(51) Int. Cl.
*H01M 8/06* (2006.01)

(52) U.S. Cl.
USPC .......................................... 429/414

(58) Field of Classification Search
None
See application file for complete search history.

(56) References Cited

U.S. PATENT DOCUMENTS

| | | | |
|---|---|---|---|
| 7,267,902 B2 * | 9/2007 | Brunk et al. .................. | 429/481 |
| 2007/0231470 A1 | 10/2007 | Koyama et al. | |
| 2008/0075940 A1 * | 3/2008 | Schafer et al. ................ | 428/220 |
| 2009/0130301 A1 | 5/2009 | Bahnmuller et al. | |
| 2010/0144228 A1 | 6/2010 | Branham et al. | |
| 2011/0104571 A1 | 5/2011 | Zhamu et al. | |
| 2011/0147673 A1 | 6/2011 | Gaillard et al. | |
| 2011/0151255 A1 | 6/2011 | Kim et al. | |
| 2011/0318642 A1 | 12/2011 | Nishiyama et al. | |

FOREIGN PATENT DOCUMENTS

| | | |
|---|---|---|
| JP | 10-058572 | 7/1996 |
| JP | 2005-116338 | 10/2003 |
| JP | 2005116336 | 10/2003 |
| JP | 2004281363 | 10/2004 |
| JP | 2005071755 | 3/2005 |
| JP | 2006-318790 | 11/2006 |
| JP | 2007-273190 | 10/2007 |
| JP | 2008-201106 | 9/2008 |
| JP | 2009-287138 | 12/2009 |
| JP | 2010-192361 | 9/2010 |

(Continued)

OTHER PUBLICATIONS

"Technological Trend Research on Fuel Cell", Technological Trend Group, Technology Research Section, General Affairs Dept., May 31, 2011.

(Continued)

*Primary Examiner* — Patrick Ryan
*Assistant Examiner* — Jose Colucci Rios
(74) *Attorney, Agent, or Firm* — K&L Gates LLP

(57) ABSTRACT

A water control sheet having superior drainage and gas diffusion properties and superior handling characteristics, and a gas diffusion sheet, a membrane-electrode assembly and a polymer electrolyte fuel cell, which utilize the water control sheet, are provided. The water control sheet is independent and located for use adjacent to a catalyst layer of a polymer electrolyte fuel cell, and is formed of a nonwoven fabric containing conductive fibers containing conductive particles at least inside a hydrophobic organic resin. The gas diffusion sheet, the membrane-electrode assembly and the polymer electrolyte fuel cell according to the present invention have the above water control sheet.

4 Claims, 12 Drawing Sheets

(56) References Cited

FOREIGN PATENT DOCUMENTS

| WO | 2006-054636 | A1 | 5/2006 |
| WO | 2007-095219 | A2 | 8/2007 |
| WO | 2009-030355 | A2 | 3/2009 |
| WO | 2009-096365 | A1 | 8/2009 |
| WO | 2010-001044 | A2 | 1/2010 |
| WO | 2010-028017 | A2 | 3/2010 |
| WO | 2010-103927 | A1 | 9/2010 |

OTHER PUBLICATIONS

European Patent Office, Extended European Search Report, issued in connection with European Patent Application No. 12154209.6, dated May 8, 2012. (8 pages).

* cited by examiner

WATER CONTROL SHEET, GAS DIFFUSION SHEET, MEMBRANE-ELECTRODE ASSEMBLY AND POLYMER ELECTROLYTE FUEL CELL

BACKGROUND OF THE INVENTION

1. Field of the Invention

The present invention relates to a water control sheet, a gas diffusion sheet, a membrane-electrode assembly and a polymer electrolyte fuel cell, and to an independent water control sheet which has a shape retention property to be handled by itself, and a gas diffusion sheet, membrane-electrode assembly and polymer electrolyte fuel cell utilizing the water control sheet.

2. Related Background Art

On concern of depletion of oil resources, main challenges are to search for alternative fuels and to save resources regarding energy used in various forms. Among others, fuel cells which convert various fuels into chemical energy and produce electric power have been actively developed.

As described on page 5 of "Technical trend research on fuel cells" (Ed. Department of Technology Research, Japanese Patent Office, May 31, 2001, <URL> http://www.jpo.go.jp/shiryou/index.htm) [non-patent document 1], for example, fuel cells are classified into 4 groups depending on the type of electrolytes employed: phosphoric acid fuel cells (PAFCs), molten carbonate fuel cells (MCFCs), solid oxide fuel cells (SOFCs) and polymer electrolyte fuel cells (PEFCs). The operating temperature ranges of these types of fuel cells are limited depending on the electrolytes, and it has been known that PEFCs operate at a low temperature range of 100° C. or lower, PAFCs at a medium temperature range of 180° C. to 210° C., and MCFCs at a high temperature range of 600° C. or more and SOFCs at near 1000° C. Among these, common PEFCs which can operate in a low temperature range produce electric power incident to the chemical reaction between the fuels, hydrogen gas and oxygen-containing gas (e.g. air). As PEFCs allow production of electric power with relatively small apparatus configurations, their practical application has been urgently required.

FIG. 11 is a schematic sectional view of main parts of a fuel cell showing the fundamental configuration of conventional PEFCs. In this figure, components being constituted with substantially the same material or having substantially the same function are shown with the same hatchings. PEFCs comprise, as shown in FIG. 11, more than one cell unit stacked together, each unit comprising a membrane-electrode assembly (MEA) formed of a fuel electrode 17$a$, a polymer electrolyte membrane 19 and an air electrode 17$c$ sandwiched between a pair of bipolar plates 11$a$ and 11$c$. The fuel electrode 17$a$ is composed of a catalyst layer 15$a$ separating hydrogen into protons and electrons and a gas diffusion layer 13$a$ providing fuel gas to the catalyst layer 15$a$, and between the catalyst layer 15$a$ and the gas diffusion layer 13$a$ is provided a water control layer 14$a$. On the other hand, the air electrode 17$c$ is composed of a catalyst layer 15$c$ in which reaction between protons, electrons and oxygen-containing gas occurs and a gas diffusion layer 13$c$ providing oxygen-containing gas to the catalyst layer 15$c$, and between the catalyst layer 15$c$ and the gas diffusion layer 13$c$ is provided a water control layer 14$c$.

The bipolar plate 11$a$ has grooves for providing fuel gas. Fuel gas supplied through the grooves of the bipolar plate 11$a$ diffuses through the gas diffusion layer 13$a$, is penetrated through the water control layer 14$a$ and reaches the catalyst layer 15$a$. The supplied fuel gas is separated into protons and electrons, among which protons travel through the polymer electrolyte membrane 19 and reaches the catalyst layer 15$c$. On the other hand, electrons travel through an external circuit (not shown) and move to the air electrode 17$c$. Meanwhile, the bipolar plate 11$c$ has grooves for providing oxygen-containing gas. The oxygen-containing gas supplied through the grooves of the bipolar plate 11$c$ diffuses through the gas diffusion layer 13$c$, is penetrated through the water control layer 14$c$ and reaches the catalyst layer 15$c$. The supplied oxygen-containing gas reacts with protons traveled through the polymer electrolyte membrane 19 and electrons moved through the external circuit to produce water. The produced water is ejected from the fuel cell through the water control layer 14$c$. Reverse-diffused water from the air electrode is also ejected from the fuel cell through the water control layer 14$a$ at the fuel electrode.

The gas diffusion layers 13$a$ and 13$c$ and the water control layers 14$a$ and 14$c$ are required to have, under low moisture conditions, a moisture retaining property in order to maintain the polymer electrolyte membrane 19 wet and under high moisture conditions, a drainage property in order to prevent retention of water and flooding in the fuel cell. The conventional gas diffusion layers 13$a$ and 13$c$ and water control layers 14$a$ and 14$c$ are prepared by impregnating an conductive porous substrate such as a carbon paper with a fluororesin such as polytetrafluoroethylene or applying a paste of carbon powder mixed with a fluororesin on the conductive porous substrate, thereby forming the water control layers 14$a$ and 14$c$ as a region where the fluororesin or the carbon powder and fluororesin are present and the gas diffusion layers 13$a$ and 13$c$ as a region where this(these) material(s) is(are) not present. However, the thus-formed water control layers 14$a$ and 14$c$ may easily have decreased drainage and gas diffusion properties because excess fluororesin or carbon powder and fluororesin are impregnated to the conductive porous substrate. The water control layers 14$a$ and 14$c$ prepared according to such method also have low water and gas permeability in the planar direction (the direction perpendicular to the thickness), so as to cause reduction in fuel cell performances under the situation where high amount of water is produced due to their decreased drainage and gas diffusion properties.

Another method for preparing water control layers has been suggested in which a substrate is coated with a dispersion of a fluororesin and carbon to prepare a coated film and then the film (water control layer) is fixed on an conductive porous substrate by applying pressure, by which method the water control layer is prevented from impregnation (Japanese Patent Application Laid-open No. 2006-318790) [patent document 1]. However, this water control layer has insufficient drainage and gas diffusion properties because the layer formed is dense due to coating.

Still another method for preparing water control layers has been known in which electrospun nanofibers are formed or stacked on an conductive substrate and then the substrate is calcinated to form a carbonized nanofiber layer on the substrate (Japanese Patent Application laid-open No. 2007-273190 [patent document 2] and Japanese Patent Application laid-open No. 2008-201106 [patent document 3]). However, the obtained carbonized nanofibers are hard and brittle, deteriorating the handling characteristics. In addition, productivity is low with high cost due to calcination after formation of the nanofibers, making the process impractical.

In order to improve efficiency of calcination, it is suggested to electrospin a carbon black dispersed polymer material-containing solution to form a deposition layer before irradiation of a microwave to obtain carbon fibers (WO 2006/054636) [patent document 4]. However, this method also has, in addition to the similar problems as above patent documents 2 and 3 (Japanese Patent Application laid-open No. 2007-273190 and Japanese Patent Application laid-open No. 2008-201106), such problems that the drainage property is not sufficient due to the absence of a hydrophobic resin so that flooding easily occurs.

The present applicant has suggested a water control sheet in which a fluororesin and/or an conductive agent is loaded on a non-carbonized porous substrate sheet which has been formed without carbonization (Japanese Patent Application Laid-open No. 2010-192361) [patent document 5]. Although this water control sheet has such superior handling characteristics that it can be handled by itself, loading of the fluororesin and/or conductive agent may cause insufficient drainage and gas diffusion properties.

SUMMARY OF THE INVENTION

In order to solve the above problems, an object of the present invention is to provide a water control sheet having superior drainage and gas diffusion properties and handling characteristics, and a gas diffusion sheet, membrane-electrode assembly and polymer electrolyte fuel cell utilizing the water control sheet.

The invention according to a first aspect of the present invention is "a water control sheet which is independent and located for use adjacent to a catalyst layer of a polymer electrolyte fuel cell, wherein the water control sheet is formed of a nonwoven fabric containing conductive fibers containing conductive particles at least inside a hydrophobic organic resin".

The invention according to a second aspect of the present invention is "a gas diffusion sheet comprising the water control sheet according to the first aspect".

The invention according to a third aspect of the present invention is "a membrane-electrode assembly comprising the water control sheet according to the first aspect".

The invention according to a fourth aspect of the present invention is "a polymer electrolyte fuel cell comprising the water control sheet according to the first aspect".

The invention according to the first aspect is the water control sheet formed of the nonwoven fabric containing the conductive fibers. Unlike the conventional sheets which are filled with a fluororesin and carbon, the present sheet is porous which is inherent to the nonwoven fabric, thereby having superior drainage and gas diffusion properties even in the planar direction. Accordingly, a fuel cell having increased power generation performance can be produced even under high moisture conditions.

The water control layer can be formed by merely stacking the water control sheet on a conductive porous sheet without application or impregnation with a fluororesin and carbon. Thus, drainage and gas diffusion properties which are inherent to the conductive porous sheet can be exerted because the conductive porous sheet has not been soaked with the fluororesin or carbon.

The conductive fibers are composed of the hydrophobic organic resin which is not as brittle as a carbonized fiber; thus the water control sheet has not only superior handling characteristics but also cushioning properties such that the sheet is not damaged upon swelling/shrinking of the polymer electrolyte membrane during power generation. The sheet also has superior drainage properties. Because the sheet does not require carbonization treatment, it can provide superior productivity and is cheap. The conductive fibers contain the conductive particles at least internally thereof, thus the sheet has superior conductivity. The sheet can be thinned, consequently the resistance and the volume of the fuel cell can be reduced.

The inventions according to the second and third aspects of the present invention are the gas diffusion sheet and membrane-electrode assembly which have superior drainage and gas diffusion properties because of comprising the water control sheet according to the first aspect, thereby allowing production of a fuel cell having superior power generation performance.

The invention according to the fourth aspect of the present invention is a fuel cell which have superior drainage and gas diffusion properties because of comprising the water control sheet according to the first aspect, thereby having superior power generation performance.

DESCRIPTION OF THE PREFERRED EMBODIMENTS

Figure 1:
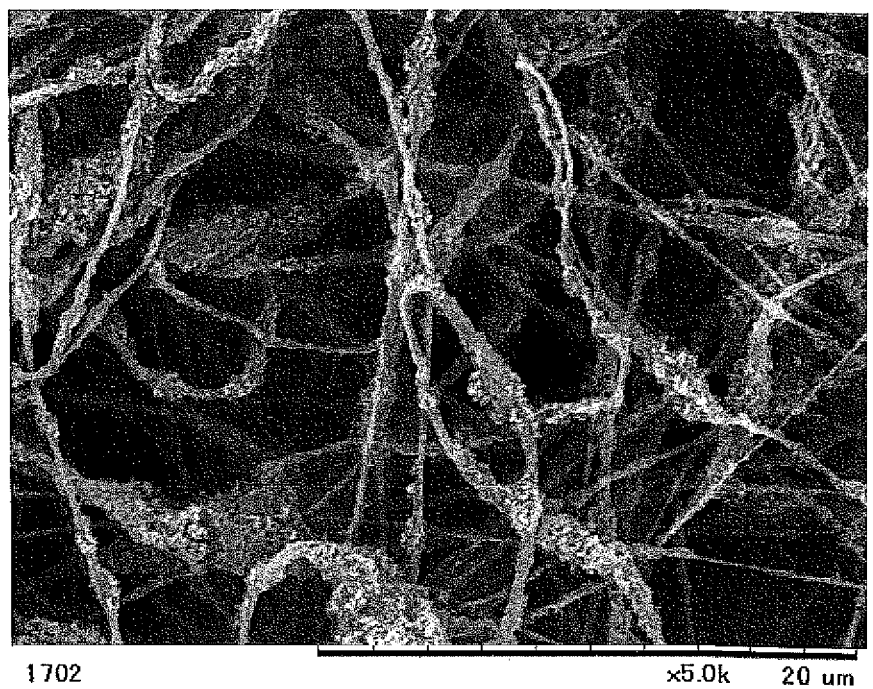
FIG. 1 is an electron micrograph of a gas diffusion sheet of example 1.

The water control sheet according to the present invention is composed of a nonwoven fabric comprising conductive fibers containing conductive particles at least internally of a hydrophobic organic resin. The water control sheet according to the present invention is composed of the hydrophobic organic resin, so that it has superior water permeability even without impregnation with a hydrophobic resin such as fluororesins and also has a superior drainage property. The "hydrophobic organic resin" is an organic resin having 90° or more contact angle with water, the organic resin excluding diamonds, graphite and amorphous carbon. Such hydrophobic organic resin may include, for example, fluororesins such as polytetrafluoroethylene (PTFE), polychlorotrifluoroethylene (PCTFE), polyvinylidene fluoride (PVDF), polyvinyl fluoride (PVF), perfluoroalkoxy fluororesins (PFAs), tetrafluoroethylene-hexafluoropropylene copolymers (FEPs), ethylene-tetrafluoroethylene copolymers (ETFEs), ethylene-chlorotrifluoroethylene copolymers (ECTFEs), vinylidene fluoride-tetrafluoroethylene-hexafluoropropylene copolymers and copolymers composed of monomers constituting the above-mentioned resins; polyolefin resins such as polyethylene (PE), polypropylene (PP); polyester resins such as polyethylene terephthalate (PET), polyethylene naphthalate (PEN). These resins may be used alone or two or more resins may be mixed. Among these, fluororesins are suitable because of their improved heat resistance, chemical resistance and hydrophobicity.

The conductive fibers according to the present invention contain the conductive particles at least internally of the hydrophobic organic resin so that they have superior electron transfer property in a fuel electrode or air electrode. When the conductive particles exist only on the outer surface of the hydrophobic organic resin, the conductivity may be reduced because the hydrophobic organic resin component serves as a resistance component. However, according to the present invention, the conductive particles exist internally of the hydrophobic organic resin, thereby realizing superior conductivity. In view of the conductivity, the conductive particles are preferably exposed from the hydrophobic organic resin. The expression "contain an conductive particle internally" means not only the situation in which the conductive particle is completely embedded in the hydrophobic organic resin, but also the situation in which a part of the conductive particle is exposed from the hydrophobic organic resin. The conductive fibers containing the conductive particles at least internally of the hydrophobic organic resin can be prepared by, for example, spinning a spinning solution containing the hydrophobic organic resin and the conductive particles.

The conductive particle may be, but not limited to, carbon black, carbon nanotube, carbon nanofiber, metal particle, metal oxide particle or the like. Among these, carbon black is suitably used because of their chemical resistance, conductivity and dispersibility. The average primary particle diameter of such suitable carbon black may be, but not limited to, 5 nm to 200 nm, and more preferably 10 nm to 100 nm. The average primary particle diameter of the conductive particles is preferably smaller than the fiber diameter of conductive fiber to be described later, so that the particle may not be dropped and the shape of the fiber can be easily formed.

As used herein, the "conductivity" means an electric resistivity of $10^5 \Omega \cdot cm$ or lower, preferably $10^2 \Omega \cdot cm$ or lower.

The mass ratio between the conductive particle and the hydrophobic organic resin is preferably, but not limited to, 10 to 90:90 to 10, more preferably 20 to 80:80 to 20, and still more preferably 30 to 70:70 to 30. If the conductive particle is lower than 10 mass %, the conductivity may be insufficient, while if the conductive particle is more than 90 mass %, the fiber formation property may be deteriorated.

The conductive particle preferably accounts for 10 mass % to 90 mass %, and more preferably 20 mass % to 80 mass % of the water control sheet in order to have superior conductivity, water permeability and drainage properties.

The average fiber diameter of the conductive fibers according to the present invention is preferably, but not limited to, 10 nm to 10 μm. When the average fiber diameter is more than 10 μm, the points of contact between the fibers are reduced, thereby resulting in insufficient conductivity, while when the average fiber diameter is lower than 10 nm, the fibers may have difficulty in inclusion of the conductive particle therein. The average fiber diameter of the conductive fiber is preferably five or more times of the primary particle diameter of the conductive particles in order to prevent loss of the conductive particles.

The "average fiber diameter" according to the present invention means an arithmetic average of the fiber diameters at 40 points, and the "fiber diameter" is the value calculated from a micrograph and represents, when all conductive fibers contain the exposed conductive particles, the diameter of the cross section including the exposed conductive particles, and when all conductive fibers do not contain the exposed conductive particles or some conductive fibers contain the exposed conductive particles and some conductive fibers contain the unexposed part of the conductive particles, the diameter of the cross section at the unexposed part of the conductive particles.

The conductive fibers according to the present invention are preferably continuous fibers so that they have a superior electron transfer property. Such conductive continuous fibers can be produced by, for example, electrostatic spinning, spunbond, melt blown or a method in which fibers are obtained by applying a linear shear force to a spinning solution by parallel ejecting gas to the spinning solution extruded from a liquid extruding part as disclosed in Japanese Patent Application Laid-open No. 2009-287138.

The nonwoven fabric corresponding to the water control sheet according to the present invention comprises the above conductive fibers. Because the sheet has the porosity inherent to the nonwoven fabric, unlike the conventional sheet which is filled with a fluororesin and carbon, the sheet has superior drainage and gas diffusion properties even in the planar direction, thereby allowing production of fuel cells having high power generation performance even under high moisture conditions. A water control layer can be formed by merely stacking the water control sheet on a conductive porous sheet without soaking the conductive porous sheet with a fluororesin and carbon. Thus, drainage and gas diffusion properties inherent to the conductive porous sheet can be exerted. In addition, the conductive fibers are composed of the hydrophobic organic resin which is not as brittle as carbonized fibers; thus the water control sheet has not only superior handling characteristics but also cushioning properties such that the sheet is not damaged upon swelling/shrinking of the polymer electrolyte membrane during power generation. Because the sheet does not require carbonization treatment, it has superior productivity and is cheap.

The mass content of the conductive fibers in the nonwoven fabric corresponding to the water control sheet according to the present invention is preferably 10% or more, more preferably 50% or more and it is preferable that the nonwoven fabric is composed only of the conductive fibers, in order to improve the electron transfer property. The water control sheet may comprise, other than the conductive fibers, hydrophobic organic resin fibers such as fluorofibers and polyolefin fibers.

The water control sheet according to the present invention may comprise fibers other than the conductive fibers. The present water control sheet has the electric resistivity of $10^7 \Omega \cdot cm$ or lower, and more preferably $10^5 \Omega \cdot cm$ or lower in order to have superior conductivity. The "electric resistivity" means the value determined by measuring the water control sheet which is 6-cm square with a resistivity meter (Mitsubishi Chemical Corp., Loresta) according to the four probe method.

The nonwoven fabric corresponding to the water control sheet according to the present invention may be bonded using an adhesive in order to maintain the shape. However, in order to improve the conductivity, it is preferable that the shape is maintained by bonding the hydrophobic organic resin that constitutes the conductive fibers. The hydrophobic organic resin may be suitably bonded by, for example, entanglements between fibers, plasticization with a solvent or thermal fusion.

The weight per unit area of the nonwoven fabric corresponding to the water control sheet according to the present invention is preferably, but not limited to, 0.5 g/m² to 100 g/m², and more preferably 0.5 g/m² to 50 g/m² in view of handling characteristics and productivity. The thickness is preferably, but again not limited to, 1 μm to 200 μm, more preferably 1 μm to 100 μm, and still more preferably 3 μm to 100 μm. Because of this low thickness of the water control sheet according to the present invention, the resulting resistance of the fuel cell can be decreased and the volume thereof can also be decreased. The "weight per unit area" is the value obtained by measuring the mass of a sample water control sheet which is 10-cm square and converting the result into the mass of the sheet having a size of 1 m², wherein the "thickness" is the value determined with a thickness gauge (Mitutoyo Corp.: Code No. 547-321; measuring force 1.5 N or lower).

The nonwoven fabric corresponding to the water control sheet according to the present invention is porous as described above, thus it has superior drainage and gas diffusion properties in the planar direction and allows production of fuel cells having high power generation performance even under high moisture conditions. The porosity corresponding to the void ratio of the nonwoven fabric is 60% or more and preferably 70% or more. The void ratio P (unit: %) is the value obtained by the following formula:

$$P=100-(Fr1+Fr2+\ldots+Frn)$$

wherein Frn is a filling rate of a component n constituting the water control sheet (nonwoven fabric) (unit: %) and is obtained from the following formula:

$$Frn=(M \times Prn/T \times SGn) \times 100$$

wherein M is a weight per unit area of the water control sheet (nonwoven fabric) (unit: g/cm²), T is a thickness of the water control sheet (nonwoven fabric) (cm), Prn is a mass ratio of a component n (e.g. the hydrophobic organic resin, conductive particles) existing in the water control sheet (nonwoven fabric), and SGn is a specific gravity of the component n (unit: g/cm³).

The water control sheet (nonwoven fabric) according to the present invention can be used by arranging the same adjacent to a catalyst layer of a polymer electrolyte fuel cell, and is independent. For example, it can be used by arranging the same between a catalyst layer and a bipolar plate, or between a catalyst layer and a gas diffusion layer.

The water control sheet according to the present invention allows to produce a gas diffusion sheet having superior drainage and gas diffusion properties by stacking the present water control sheet on a conductive porous sheet because it is prevented that water control layer component materials are soaked into the conductive porous sheet constituting the gas diffusion layer to inhibit drainage and gas diffusion properties. Namely, when a paste containing a fluororesin and conductive particles is applied to the conductive porous sheet, the paste is soaked excessively to the conductive porous sheet to block fine pores of the conductive porous sheet; however, this does not happen for the present invention so that drainage and gas diffusion properties inherent to the conductive porous sheet can be exerted. In addition, the gas diffusion sheet can be formed by stacking the water control sheet on the conductive porous sheet and the conventional step of applying the paste on the conductive porous sheet can be omitted, thereby improving the workability.

"Independent" means the shape retention property of the water control sheet such that it can be handled by itself and can be distributed after winding the sheet into a roll. However, it is not necessary to handle the water control sheet alone, and a gas diffusion sheet in which the water control sheet is stacked on a conductive porous sheet and a membrane-electrode assembly comprising the water control sheet may also be distributed.

The conductive fibers of the nonwoven fabric corresponding to the water control sheet according to the present invention can be obtained by, for example, spinning a spinning solution in which the hydrophobic organic resin and the conductive particles are mixed. The conductive fibers are directly collected and piled up to form a fiber web. If this fiber web itself is appropriately entangled and has a strength that allows handling thereof, it can be used as the water control sheet, or it can be bonded by plasticization with a solvent, thermal fusion or bonding with an adhesive in order to impart or improve the strength to obtain the water control sheet. It is preferable that the fibers constituting the fiber web obtained by directly collecting the conductive fibers and piling them up are continuous long fibers, because the continuous long fibers have superior conductivity and strength.

The fiber web can be produced by, for example, electrostatic spinning, spunbond, melt blown or a method in which fibers are obtained by applying a linear shear force to a spinning solution by parallel discharging gas to the spinning solution discharged from a liquid discharging part as disclosed in Japanese Patent Application Laid-open No. 2009-287138. Among these methods, electrostatic spinning and the method disclosed in Japanese Patent Application Laid-open No. 2009-287138 allow spinning of fibers having a small fiber diameter, thereby decreasing the thickness of the water control sheet (nonwoven fabric) and as a result, decreasing resistance of the fuel cell. These methods are suitable also because the volume of the fuel cell can be decreased. When the conductive particles are mixed in a solution obtained by dissolving the hydrophobic organic resin in a solvent as in electrostatic spinning and the method disclosed in Japanese Patent Application Laid-open No. 2009-287138, it is preferable to use a slightly volatile solvent upon spinning and to remove the spinning solvent by solvent substitution after the formation of the fiber web or nonwoven fabric, because the conductive fibers are easily bonded by plasticization, resulting in production of the water control sheet (nonwoven fabric) having high conductivity, as well as the water control sheet becomes dense and contact resistance in the fuel cell can be easily decreased.

The water control sheet can also be obtained by winding the conductive fibers as continuous fibers, cutting the conductive fibers into a desired fiber length to obtain short fibers, forming a fiber web by a known dry or wet method and bonding it by plasticization with a solvent, thermal fusion, bonding with an adhesive or the like.

The gas diffusion sheet according to the present invention comprises the water control sheet, so that it has superior drainage and gas diffusion properties and allows production of a fuel cell having superior power generation performance. The gas diffusion sheet according to the present invention has a structure similar to the conventional gas diffusion layer in which a water control sheet is stacked on a conductive porous sheet except that the gas diffusion sheet comprises the above water control sheet. The conductive porous sheet may include, for example, carbon paper, carbon nonwoven fabric, a mixture of glass fiber nonwoven fabric with a conductive material and a fluororesin, an organic fiber nonwoven formed of acid-resistant organic fibers (e.g. containing one or more of polytetrafluoroethylene fibers, polyvinylidene fluoride fibers, polyparaphenylene terephthalamide fibers, polyolefin fibers, polyphenylene sulfide fibers, polyester fibers represented by polyethylene terephthalate fibers and polytrimethylene terephthalate fibers) filled with a conductive material and a fluororesin, an acid-resistant metal porous sheet (porous sheet made of a metal such as stainless steel, titanium and the like). The conductive porous sheet and the water control sheet may be or may not be integrated. They can be integrated by hot press.

The membrane-electrode assembly according to the present invention comprises the above water control sheet and thus has superior drainage and gas diffusion properties, thereby allowing production of a fuel cell having superior power generation performance. The membrane-electrode assembly according to the present invention can be the same as conventional membrane-electrode assembly except that the former comprises the above water control sheet. The membrane-electrode assembly can be produced by sandwiching the polymer electrolyte membrane between the catalyst layers of each of a pair of gas diffusion electrodes and bonding them by heat press.

The gas diffusion electrode can be produced by, for example, mixing a catalyst (e.g. carbon powder carrying a catalyst such as platinum) in a solvent formed of ethyl alcohol, propyl alcohol, butyl alcohol, ethylene glycol dimethyl ether or mixture of thereof, further adding an electrolyte resin solution before uniformly mixing by ultrasonic dispersion or the like to prepare a catalyst dispersed suspension, coating or spraying the catalyst dispersed suspension on the water control sheet of the gas diffusion sheet, and drying it to form the catalyst layer. Alternatively, it can be produced by coating or spraying the catalyst dispersed suspension on the water control sheet, drying the same to form the catalyst layer before staking the catalyst layer on the conductive porous sheet.

The catalyst layer can be formed by other methods such as the one in which the polymer electrolyte membrane is directly coated or sprayed with the catalyst dispersed suspension or the one in which a catalyst layer is formed by coating or spraying the catalyst dispersed suspension on a transfer substrate such as a polytetrafluoroethylene substrate before transferring only the catalyst layer on the polymer electrolyte membrane by hot press.

When the water control sheet according to the present invention is coated or sprayed with the catalyst dispersed suspension, the catalyst is carried on the surface of the conductive fibers, allowing not only electron transfer due to contact between the catalyst carriers but also formation of electron transfer paths due to the conductive fibers and decreasing the amount of the catalyst isolated from the electron transfer paths, compared to the conventional water control layers formed by applying carbon powder and a fluororesin, catalyst layers obtained by directly coating or spraying on polymer electrolyte membranes or catalyst layers formed by transfer method. The water control sheet is formed with the nonwoven fabric comprising the conductive fibers containing the conductive particles at least inside of the hydrophobic organic resin and is porous, so that the catalyst layer formed by supporting the catalyst on the water control sheet has superior drainage and gas diffusion properties and can stably provide sufficient gas to the triple phase boundary (the reaction field where gas, the catalyst and the electrolyte resin associate). Due to these reasons, the catalyst can be effectively utilized and the amount of the catalyst can be decreased, which are advantageous.

The polymer electrolyte membrane may be, for example, perfluorocarbon sulfonic acid resin membranes, sulfonated aromatic hydrocarbon resin membranes, alkyl sulfonic aromatic hydrocarbon resin membranes.

The membrane-electrode assembly according to the present invention may be, other than the conventional modes, a membrane-electrode assembly composed of a polymer electrolyte membrane, a catalyst layer and a water control layer (water control sheet) without the gas diffusion layer composed of the conductive porous sheet. Such membrane-electrode assembly can be produced by sandwiching a polymer electrolyte membrane between catalyst layers of each of a pair of water control layers and bonding them by hot press. A formation of the catalyst layer can be the same as those used for membrane-electrode assembly comprising the gas diffusion layer composed of the conductive porous sheet. The polymer electrolyte membrane which can be used can be the same as those used for membrane-electrode assembly comprising the gas diffusion layer composed of the conductive porous sheet.

The polymer electrolyte fuel cell according to the present invention comprises the above water control sheet, thereby having superior drainage and gas diffusion properties and as a result, superior power generation performance. The fuel cell according to the present invention may be the same as conventional fuel cells except that the former comprises the above water control sheet. The fuel cell may, for example, have such a structure that a membrane-electrode assembly which may or may not contain a gas diffusion layer composed of the above conductive porous sheet is sandwiched between a pair of bipolar plates to prepare a cell unit, and a plurality of such cell units is stacked together. The fuel cell may be produced by, for example, fixing a stacked plurality of cell units. The bipolar plate may be sufficient if it has high conductivity, does not allow gas permeation, and has a flow path that allows feeding of gas to the gas diffusion layer and/or water control sheet, and may be, but not limited to, carbon molded materials, carbon-resin composites, metal materials and the like, for example.

EXAMPLES

The examples of the present invention are described hereinafter, which do not limit the present invention.

<Preparation of Spinning Solution>

(1) First Spinning Solution;

Polyvinylidene fluoride (SOLEF® 6020/1001, Solvay Solexis) was added to N,N-dimethylformamide (DMF) and dissolved therein with a rocking mill to obtain a solution having a concentration of 10 mass %.

Conductive particles, carbon black (Denka Black particles, Denki Kagaku Kogyo, K.K., average primary particle diameter: 35 nm) were mixed into the above solution and the mixture was stirred, then DMF was added to dilute the mixture, and carbon black dispersed to prepare the first spinning solution having a solid mass ratio of carbon black and polyvinylidene fluoride of 40:60 and a solid mass content of 12 mass %.

(2) Second Spinning Solution;

The second spinning solution having a solid mass ratio of carbon black and polyvinylidene fluoride of 40:60 and a solid content of 12 mass % was prepared in the similar manner as the preparation of the first spinning solution except that polyvinylidene fluoride (KYNAR® HSV900, Arkema) was used.

(3) Third Spinning Solution;

The third spinning solution having a solid mass ratio of carbon black and polyvinylidene fluoride of 40:60 and a solid content of 12 mass % was prepared in the similar manner as the preparation of the second spinning solution except that the solvent was changed to N-methylpyrrolidone.

(4) Fourth Spinning Solution;

The fourth spinning solution was prepared in the similar manner as the preparation of the first spinning solution except that a vinylidene fluoride-tetrafluoroethylene-hexafluoropropylene copolymer (Neoflon® VT-470, Daikin Industries, Lid.) was used, which had a solid mass ratio of carbon black and the vinylidene fluoride-tetrafluoroethylene-hexafluoropropylene copolymer of 40:60 and a solid content of 12 mass %.

<Preparation of Coating Paste>

(A) First Coating Paste;

Conductive particles, carbon black (Denka Black particles, Denki Kagaku Kogyo, K.K., average primary particle diameter: 35 nm), a polytetrafluoroethylene (PTFE) dispersion (Daikin Industries, Ltd.) and a non-ionic surfactant were dispersed in water and a 2% hydroxyethyl cellulose (HEC) aqueous solution as a thickening agent was added to prepare the first coating paste having a solid mass ratio of carbon black and PTFE of 60:40 and a solid mass content of 20%.

(B) Second Coating Paste;

Polyvinylidene fluoride (SOLEF® 6020/1001, Solvay Solexis) was added to N,N-dimethylformamide (DMF) and dissolved therein with a rocking mill to obtain a solution having a concentration of 10 mass %.

Conductive particles, carbon clack (Denka Black particles, Denki Kagaku Kogyo, K.K., average primary particle diameter: 35 nm) were then mixed into the solution, and the mixture was stirred, then DMI was added to dilute the mixture, and carbon black dispersed to prepare the second coating paste having a solid mass ratio of carbon black and polyvinylidene fluoride of 40:60 and a solid mass content of 15%.

<Preparation of Water Control Sheet>

Example 1

Conductive fibers obtained by electro-spinning the first spinning solution were deposited on a carbon paper (conductive porous sheet, Toray, weight per unit area: 84 g/m$^2$, thickness: 190 μm) placed on a counter electrode to prepare a gas diffusion sheet composed of the carbon paper-water control sheet (average fiber diameter: 380 nm, weight per unit area: 6 g/m$^2$, thickness: 25 μm, void ratio 87%). The electron micrograph of the gas diffusion sheet is shown in FIG. 1. As is obvious from FIG. 1, the conductive fibers had carbon black inside of the polyvinylidene fluoride resin and a part of carbon black was exposed. The conductive fibers were continuous long fibers and upon spinning, the long fibers were entangled each other. The water control sheet was independent having a shape retention property whereby it could be handled individually even when the water control sheet was separated from the gas diffusion sheet. The electro-spinning conditions were as follows:

Nozzle: Stainless steel injection needle having an inner diameter of 0.4 mm;
Counter electrode: Stainless steel drum;
Discharge rate: 1 g/hour;
Distance between nozzle tip and carbon paper: 10 cm;
Applied voltage: 15.5 kV; and
Temperature/moisture: 25° C./50% RH.

Example 2

Figure 2:
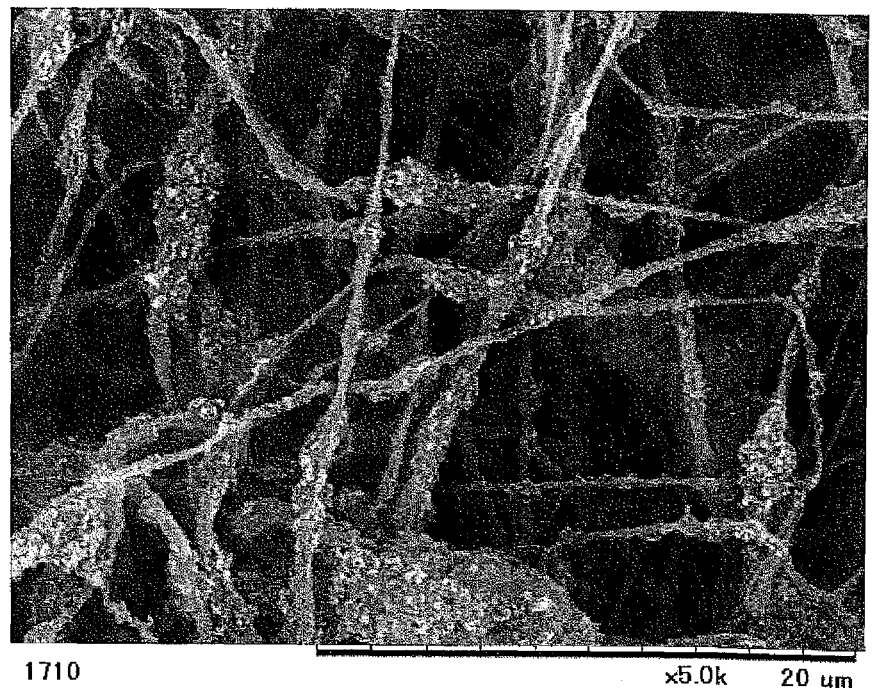
FIG. 2 is an electron micrograph of a gas diffusion sheet of example 2.

The gas diffusion sheet composed of a carbon paper-water control sheet (average fiber diameter: 480 nm, weight per unit area: 15 g/m$^2$, thickness: 60 μm, void ratio 86%) was prepared in the similar manner as example 1 except that the weight per unit area of the water control sheet was changed to 15 g/m$^2$. The electron micrograph of the gas diffusion sheet is shown in FIG. 2. As is obvious from FIG. 2, the conductive fibers had carbon black inside of the polyvinylidene fluoride resin and a part of carbon black was exposed. The conductive fibers were continuous long fibers and upon spinning, the long fibers were entangled each other. The water control sheet was independent having shape retention property whereby it could be handled individually even when the water control sheet was separated from the gas diffusion sheet.

Example 3

Figure 3:
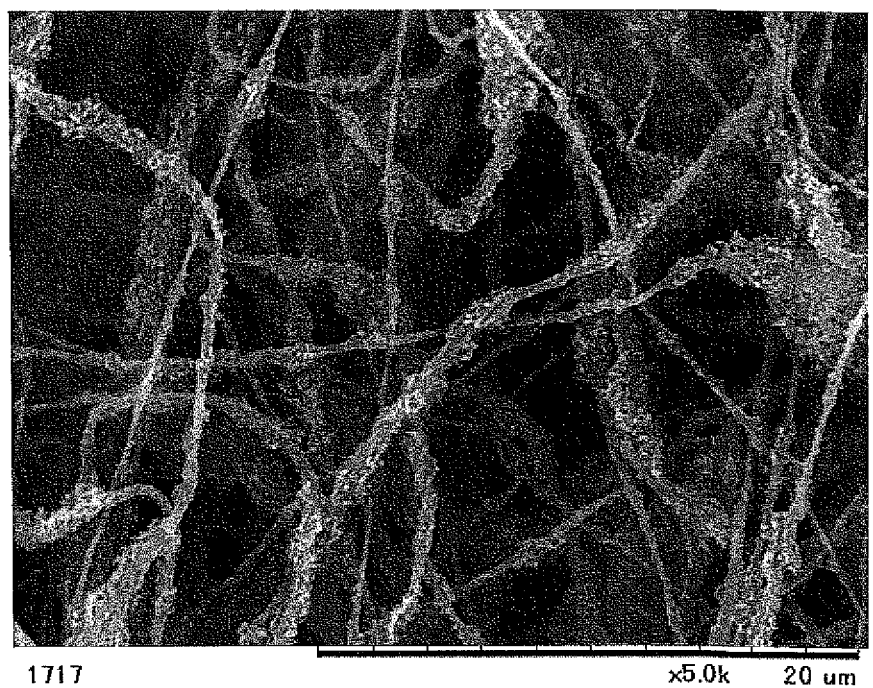
FIG. 3 is an electron micrograph of a water control sheet of example 3.

The water control sheet (average fiber diameter: 420 nm, weight per unit area: 15 g/m$^2$, thickness: 60 μm, void ratio 86%) was prepared in the similar manner as example 2 except that the carbon paper was not used and the conductive fibers were deposited on a stainless drum which was a counter electrode. The electron micrograph of the water control sheet is shown in FIG. 3. As is obvious from FIG. 3, the conductive fibers had carbon black inside of the polyvinylidene fluoride resin and a part of carbon black was exposed. The conductive fibers were continuous long fibers and upon spinning, the long fibers were entangled each other. The water control sheet was independent having shape retention property whereby it could be handled, individually even when the water control sheet was separated from the stainless drum.

Example 4

Figure 4:
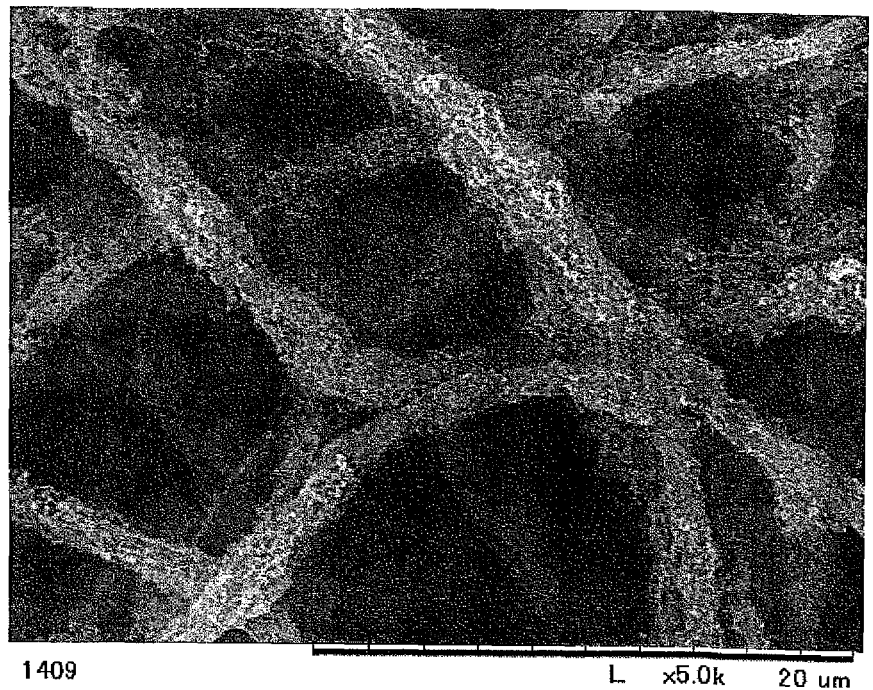
FIG. 4 is an electron micrograph of a water control sheet of example 4.

The water control sheet (average fiber diameter: 1.5 μm, weight per unit area: 8 g/m$^2$, thickness: 55 μm, void ratio 92%) was prepared in the similar manner as example 3 except that the second spinning solution was used, the applied voltage was changed to 18 kV and the weight per unit area was changed to 8 g/m$^2$. The electron micrograph of the water control sheet is shown in FIG. 4. As is obvious from FIG. 4, the conductive fibers had carbon black inside of the polyvinylidene fluoride resin and a part of carbon black was exposed. The conductive fibers were continuous long fibers and upon spinning, the long fibers were entangled each other. The water control sheet was independent having shape retention property whereby it could be handled individually even when the water control sheet was separated from the stainless drum.

Example 5

Figure 5:
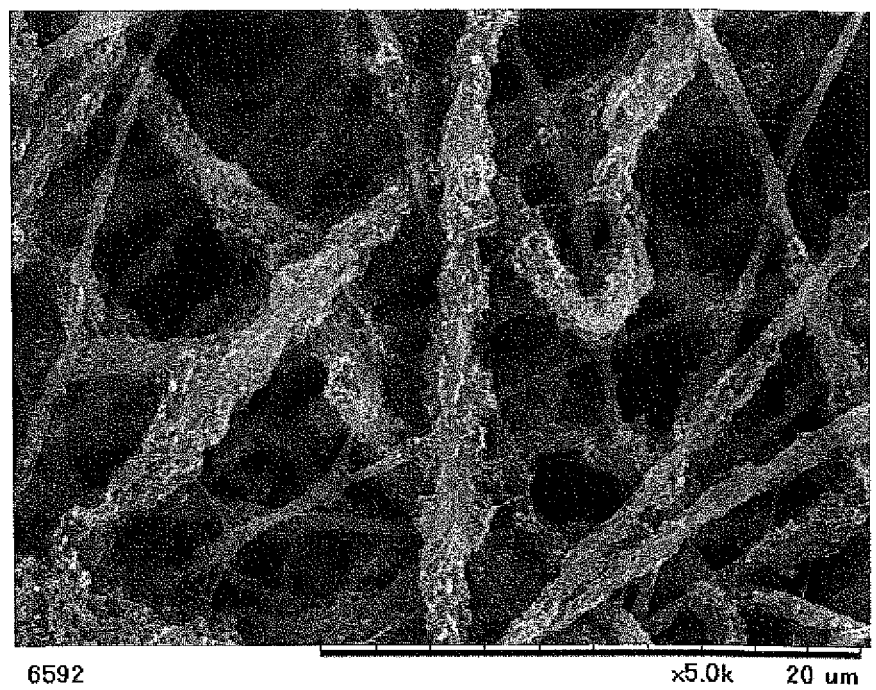
FIG. 5 is an electron micrograph of a water control sheet of example 5.

The conductive fibers were spun in the similar manner as example 4 except that the third spinning solution was used, which were then deposited to prepare a fiber web. The solvent substitution was carried out by soaking the fiber web in a water bath and then the fiber web was dried in a hot air dryer at 60° C. to obtain a water control sheet (average fiber diameter: 960 nm, weight per unit area: 27 g/m$^2$, thickness: 50 μm, void ratio 70%). The electron micrograph of the water control sheet is shown in FIG. 5. As is obvious from FIG. 5, the conductive fibers had carbon black inside of the polyvinylidene fluoride resin and a part of carbon black was exposed. The conductive fibers were in such state that polyvinylidene fluoride was plasticized and bonded by the solvent of the spinning solution upon solvent substitution. The water control sheet was independent having shape retention property by whereby it could be handled individually even when the water control sheet was separated from the stainless drum.

Example 6

Figure 12:
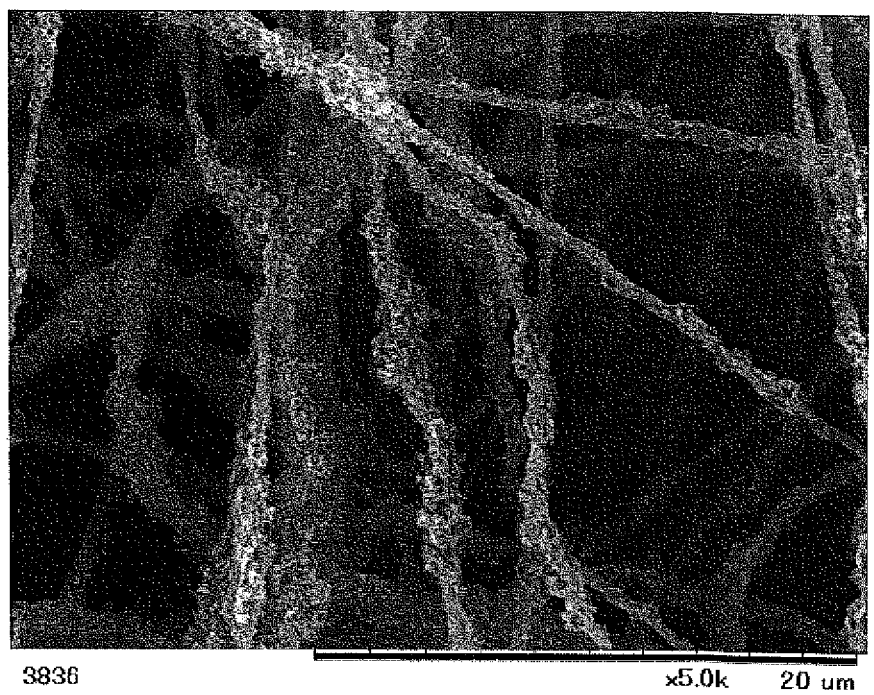
FIG. 12 is an electron micrograph of a water control sheet of example 6.

The water control sheet (average fiber diameter: 500 nm, weight per unit area: 4 g/m$^2$, thickness: 20 μm, void ratio 89%) was prepared in the similar manner as example 3 except that the fourth spinning solution was used, the voltage applied was changed to 12 kV and the humidity was changed to 40%. The electron micrograph of the water control sheet is shown in FIG. 12. As is obvious from FIG. 12, the conductive fibers had carbon black inside of the vinylidene fluoride-tetrafluoroethylene-hexafluoropropylene copolymer resin and a part of carbon black was exposed. The conductive fibers were continuous long fibers and upon spinning, the long fibers were entangled each other. The water control sheet was independent having shape retention property whereby it could be handled individually even when the water control sheet was separated from the stainless drum.

Comparative Example 1

Figure 6:
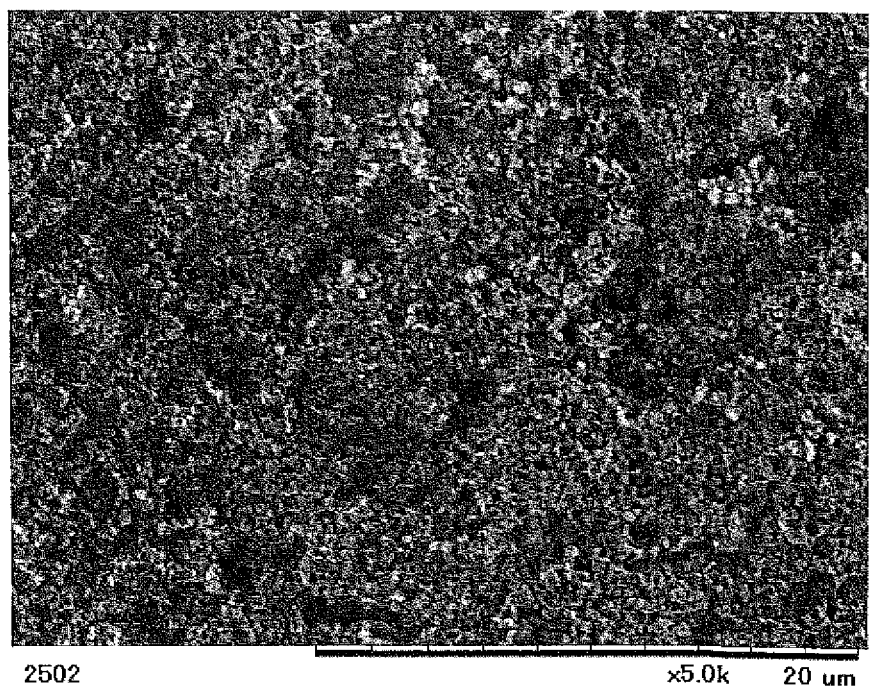
FIG. 6 is an electron micrograph of a gas diffusion sheet of comparative example 1.

On one side of a carbon paper (Toray, weight per unit area: 84 g/m$^2$, thickness: 190 μm) was applied the first coating paste and the paper was dried in a hot air dryer at 60° C. before sintering the paper at 350° C. for an hour in a heating furnace under an air atmosphere to produce a gas diffusion sheet having a weight per unit area of 110 g/m² and a thickness of 220 μm. The electron micrograph of the gas diffusion sheet is shown in FIG. 6. As is obvious from FIG. 6, the gas diffusion sheet comprised a microporous layer (water control layer) on and partly inside of the carbon paper.

Comparative Example 2

Figure 7:
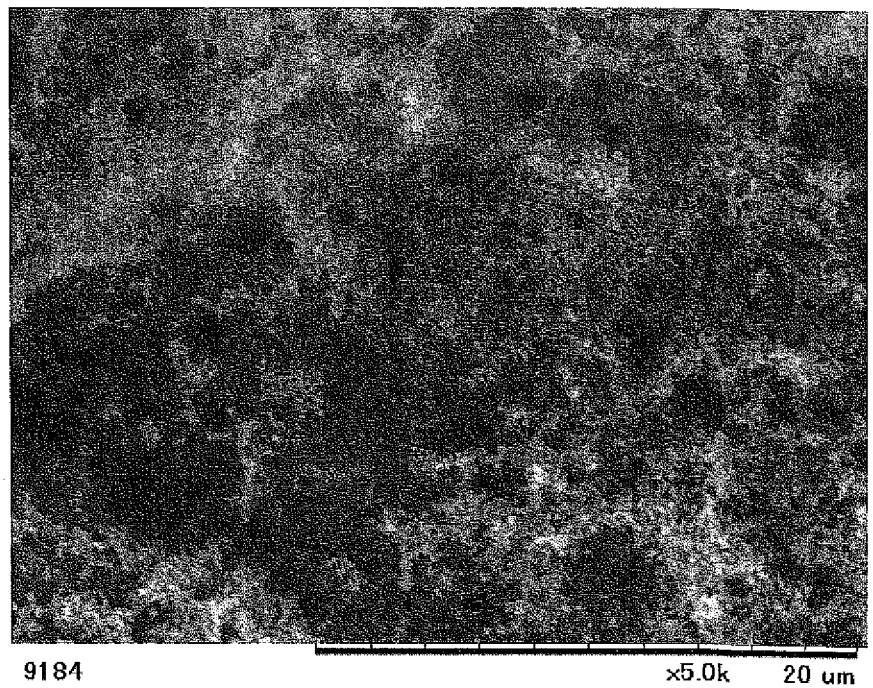
FIG. 7 is an electron micrograph of a gas diffusion sheet of comparative example 2.

On one side of a carbon paper (Toray, weight per unit area: 84 g/m², thickness: 190 μm) was applied the second coating paste and the paper was dried in a hot air dryer at 100° C. to prepare a gas diffusion sheet having a weight per unit area of 94 g/m² and a thickness of 220 μm. The electron micrograph of the gas diffusion sheet is shown in FIG. 7. As is obvious from FIG. 7, the gas diffusion sheet comprised a microporous layer (water control layer) on and partly inside of the carbon paper.

Comparative Example 3

Figure 8:
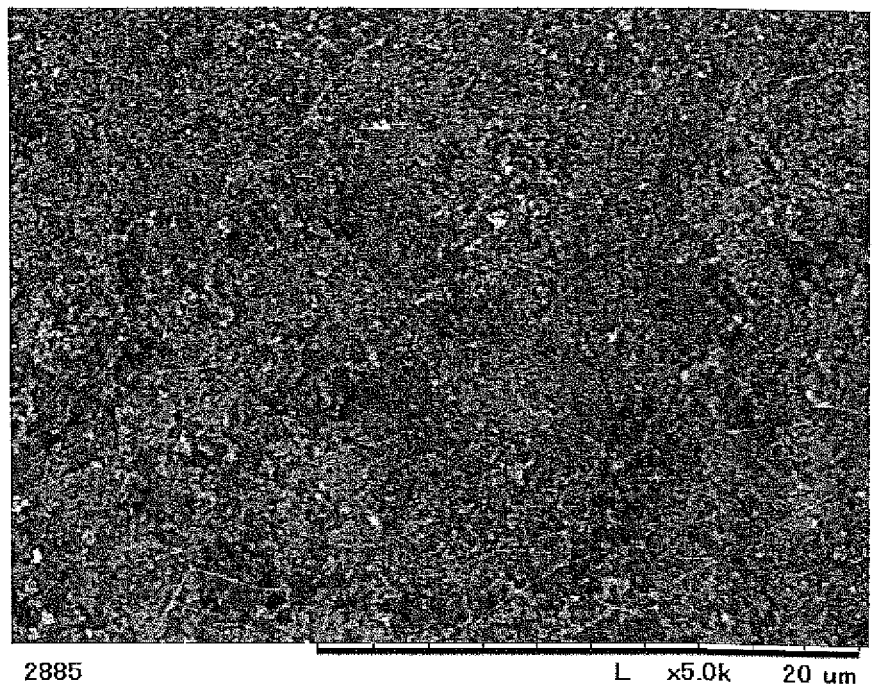
FIG. 8 is an electron micrograph of a water control sheet of comparative example 3.

On a glass nonwoven fabric (weight per unit area: 11 g/m², thickness 110 μm) was applied the first coating paste and the fabric was dried in a hot air dryer at 60° C. before sintering the fabric at 350° C. for an hour in a heating furnace under an air atmosphere and then hot-pressing the fabric at a temperature of 170° C. and a pressure of 13 MPa for 30 seconds to prepare a water control sheet having a weight per unit area of 83 g/m² and a thickness of 110 μm. The electron micrograph of the gas diffusion sheet is shown in FIG. 8. As is obvious from FIG. 8, carbon black and polytetrafluoroethylene were densely filled in a space between glass fibers.

Comparative Example 4

Figure 9:
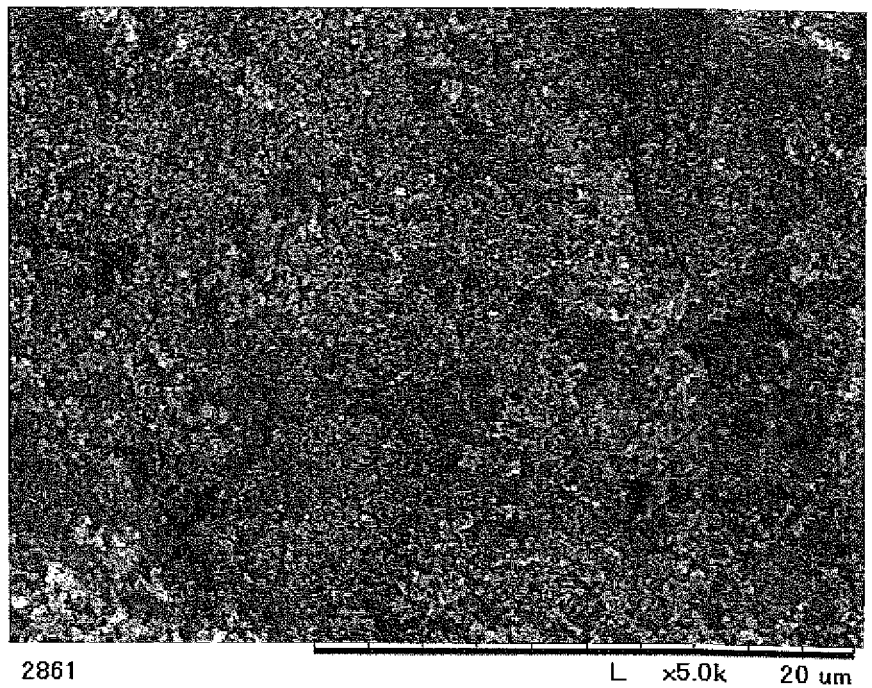
FIG. 9 is an electron micrograph of a water control sheet of comparative example 4.

A water control sheet having a weight per unit area of 83 g/m² and a thickness of 130 μm was prepared in a similar manner as comparative example 3 except that the pressure of the hot press was changed to 8 MPa. The electron micrograph of the water control sheet is shown in FIG. 9. As is obvious from FIG. 9, carbon black and polytetrafluoroethylene were densely filled in a space between glass fibers.

Comparative Example 5

Figure 10:
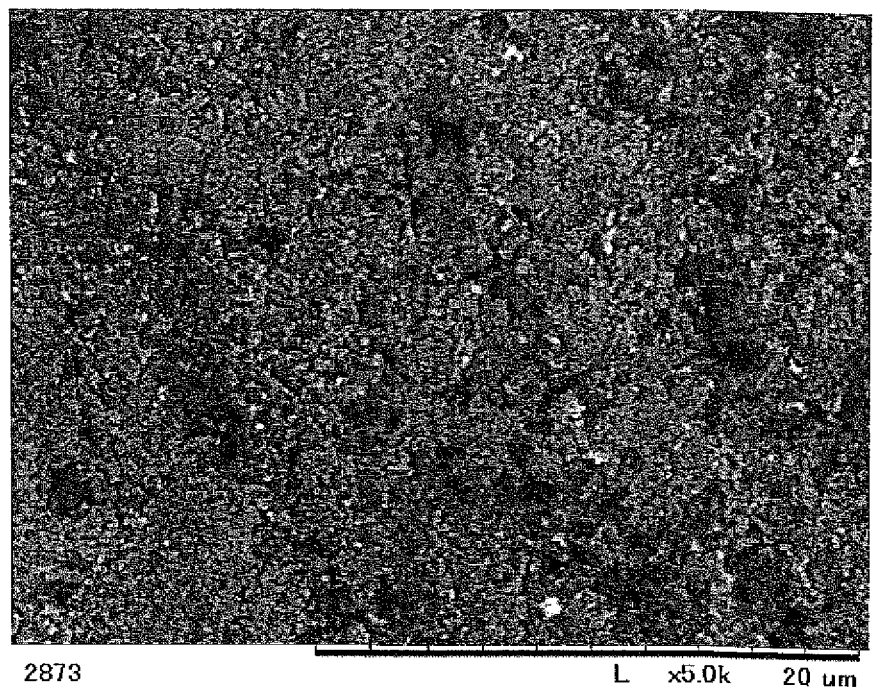
FIG. 10 is an electron micrograph of a water control sheet of comparative example 5.
Figure 11:
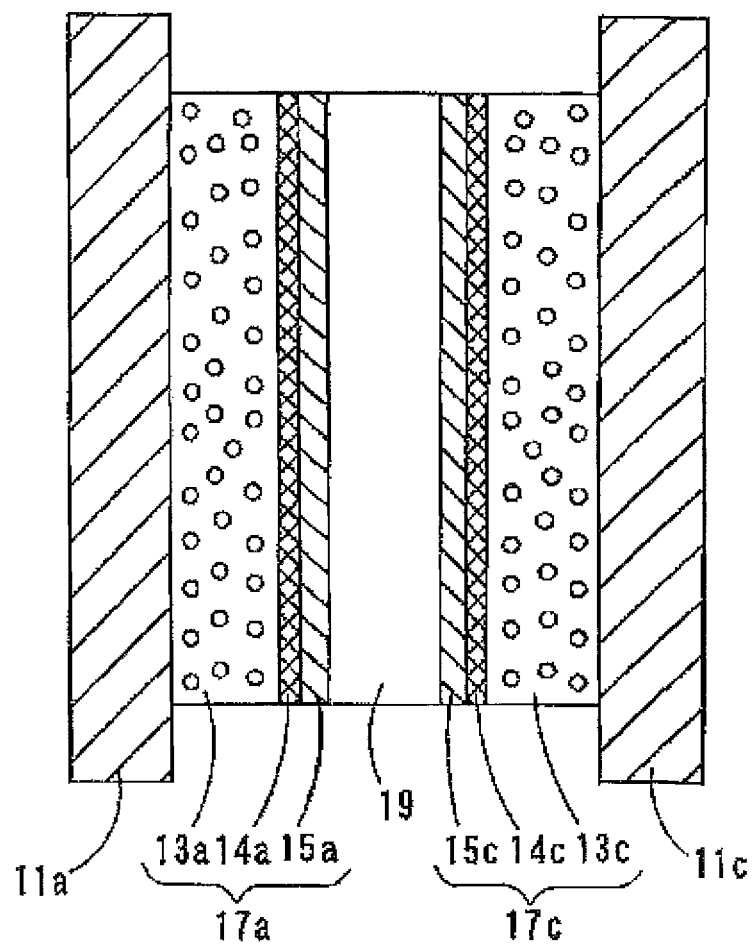
FIG. 11 is a schematic sectional view showing an outline configuration of a polymer electrolyte fuel cell.

A water control sheet having a weight per unit area of 28 g/m² and a thickness of 70 μm was prepared in a similar manner as comparative example 3 except that the glass nonwoven fabric used had a weight per unit area of 6 g/m² and a thickness of 60 μm. The electron micrograph of the water control sheet is shown in FIG. 10. As is obvious from FIG. 10, carbon black and polytetrafluoroethylene were densely filled in a space between glass fibers.

The physical properties of the above water control sheets or water control layers are summarized in table 1. The apparent densities in comparative examples 1 and 2 were calculated from the differences in mass and thickness before and after the coating on the carbon paper.

TABLE 1

| Unit | weight per unit area g/m² | Thickness μm | Apparent density g/cm³ | Void ratio % | Electric resistivity Ω·cm |
|---|---|---|---|---|---|
| Example 1 | 6 | 25 | 0.24 | 87 | $9.23 \times 10^2$ |
| Example 2 | 15 | 60 | 0.25 | 86 | $1.09 \times 10^3$ |
| Example 3 | 15 | 60 | 0.25 | 86 | $1.09 \times 10^3$ |
| Example 4 | 8 | 55 | 0.15 | 92 | $3.01 \times 10^1$ |
| Example 5 | 27 | 50 | 0.54 | 70 | $3.22 \times 10^0$ |
| Example 6 | 4 | 20 | 0.20 | 89 | $3.02 \times 10^3$ |
| Comparative example 1 | 13 | 40 | 0.33 | — | — |
| Comparative example 2 | 11 | 40 | 0.28 | — | — |
| Comparative example 3 | 83 | 110 | 0.75 | 62 | — |
| Comparative example 4 | 83 | 130 | 0.64 | 68 | — |
| Comparative example 5 | 28 | 70 | 0.40 | 80 | — |

<Power Generation Test>

0.8 g of commercial platinum-supported carbon particles (Ishifuku Metal Industry Co., Ltd., supported amount of platinum relative to carbon: 40 mass %) were added to 10.4 g of ethylene glycol dimethyl ether, and the particles were dispersed with ultrasonic treatment before addition of an electrolyte resin solution, 4.0 g of a 5 mass % commercial Nafion solution (Sigma Aldrich, U.S.A., trade name), dispersion with ultrasonic treatment and stirring with a stirrer to prepare a catalyst paste.

The catalyst paste was then applied on a support (trade name: Naflon PTFE tape, Nichias Corp., thickness: 0.1 mm), which was then dried in a hot air dryer at 60° C. to prepare a catalyst layer having a platinum supported amount relative to the support of 0.5 mg/cm².

On the other hand, a polymer electrolyte membrane, Nafion NRE212CS (trade name, Du Pont, U.S.A.) was prepared. On both sides of the polymer electrolyte membrane were stacked the catalyst layers respectively and they were bonded by hot press at a temperature of 135° C., pressure of 2.6 MPa and for 10 minutes to prepare a polymer electrolyte membrane-catalyst layer assembly.

Membrane-electrode assemblies (MEAs) (experiments 1 and 2 and comparative experiments 1 and 2) were prepared by stacking the gas diffusion sheets of examples 1 and 2 or comparative examples 1 and 2 on both sides of the polymer electrolyte membrane-catalyst layer assemblies such that the water control layer came into contact with the catalyst layer, and subjecting them to hot press. Membrane-electrode assemblies (MEAS) (experiments 3 to 6 and comparative experiments 3 to 5) were prepared by stacking the water control sheets of examples 3 to 6 or comparative examples 3 to 5 and a carbon paper (Toray, weight per unit area: 84 g/m², thickness: 190 μm) in this order on both sides of the polymer electrolyte membrane-catalyst layer assembly and subjecting them to hot press.

The MEAS were respectively attached to a polymer electrolyte fuel cell "As-510-C25-1H" (trade name, NF Corporation) with a clamp pressure of 1.5 N·m, and the obtained cells were examined for their power generation performance. This standard cell comprises a bipolar plate and is used for evaluation test of membrane-electrode assemblies (MEAs). Power generation was evaluated by obtaining a polarogram by supplying hydrogen gas to the fuel electrode with utilization of 70% and air to the air electrode with utilization of 45% at full humidifying conditions of a cell temperature of 80° C. and a bubbler temperature of 80° C. Resistivity values between the bipolar plates on an anode side and a cathode side at a current density of 2.0 A/cm² were determined. The results are shown in table 2.

TABLE 2

| | Water control sheet | | Cell voltage at each current density (V) | | | | Cell resistance |
|---|---|---|---|---|---|---|---|
| | Fuel electrode | Air electrode | 0.4 A/cm$^2$ | 1.0 A/cm$^2$ | 1.5 A/cm$^2$ | 2.0 A/cm$^2$ | (mΩ) |
| Experiment 1 | Example 1 | Example 1 | 0.62 | 0.48 | 0.37 | 0.27 | 5.12 |
| Experiment 2 | Example 2 | Example 2 | 0.62 | 0.48 | 0.37 | 0.26 | 5.02 |
| Experiment 3 | Example 3 | Example 3 | 0.63 | 0.48 | 0.36 | 0.27 | 5.15 |
| Experiment 4 | Example 4 | Example 4 | 0.63 | 0.48 | 0.37 | 0.25 | 5.02 |
| Experiment 5 | Example 5 | Example 5 | 0.64 | 0.51 | 0.42 | 0.34 | 3.58 |
| Experiment 6 | Example 6 | Example 6 | 0.65 | 0.49 | 0.39 | 0.30 | 4.74 |
| Comparative experiment 1 | Comparative example 1 | Comparative example 1 | 0.60 | 0.30 | 0.15 | 0 | — |
| Comparative experiment 2 | Comparative example 2 | Comparative example 2 | 0.66 | 0.39 | 0 | 0 | — |
| Comparative experiment 3 | Comparative example 3 | Comparative example 3 | 0.64 | 0.50 | 0.39 | 0.12 | 4.75 |
| Comparative experiment 4 | Comparative example 4 | Comparative example 4 | 0.64 | 0.48 | 0.31 | 0 | — |
| Comparative experiment 5 | Comparative example 5 | Comparative example 5 | 0.64 | 0.5 | 0.37 | 0 | — |

The results of table 2 shows that the fuel cells in which the water control sheets were used which were composed of the nonwoven fabrics comprising the conductive fibers containing conductive particles inside of the hydrophobic organic resins had superior drainage properties such that flooding was prevented even at a high current density region with increased water production under high humidity conditions and superior gas diffusion properties, thereby allowing high power generation performances.

The power generation results of experiments 2 and 3 show that similarly superior power generation performances were obtained in both cases where the present water control sheet was directly stacked on the conductive porous sheet upon spinning and where the independent water control sheet was prepared and then stacked on the conductive porous sheet.

Comparison of experiments 1 to 4 and 6 with experiment 5 shows that the water control sheet obtained by solvent substitution had, in addition to superior drainage preventing flooding at a high current density region under high humidity conditions and gas diffusion properties, decreased contact resistance in the fuel cell, thereby allowing increased power generation performance.

The present water control sheet is an independent sheet having a shape retention property which can be handled by itself and can be suitably used as a water control layer of polymer electrolyte fuel cells.

What is claimed is:

1. A water control sheet which is independent and located for use adjacent to a catalyst layer of a polymer electrolyte fuel cell,
    wherein the water control sheet includes a plurality of conductive fibers formed into a nonwoven fabric and is not filled with a fluororesin and carbon, and
    wherein each of the conductive fibers includes a hydrophobic organic resin and conductive particles from spinning a spinning solution containing the hydrophobic organic resin and the conductive particles, wherein at least one of the conductive particles exists within the resin.

2. A gas diffusion sheet comprising the water control sheet according to claim 1.

3. A membrane-electrode assembly comprising the water control sheet according to claim 1.

4. A polymer electrolyte fuel cell comprising the water control sheet according to claim 1.

* * * * *